3,378,503
ALKYLENE OXIDE ADDUCTS OF N-ALKYL-
CYCLOHEXYL-1,3-PROPANEDIAMINES
George P. Speranza and Ernest L. Yeakey, Austin, Tex.,
assignors to Jefferson Chemical Company, Inc., Houston, Tex., a corporation of Delaware
No Drawing. Filed Oct. 21, 1964, Ser. No. 405,578
10 Claims. (Cl. 260—2)

ABSTRACT OF THE DISCLOSURE

A product having the formula:

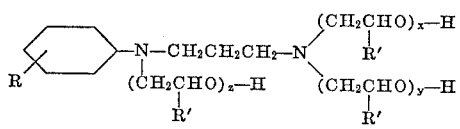

wherein R is a $C_4$–$C_{14}$ alkyl group, R' is selected from the group consisting of hydrogen, methyl, ethyl, chloromethyl, and mixtures thereof, and the sum of $x$ plus $y$ plus $z$ is 1 to 100.

The adducts are useful as detergents and as polyol intermediates in the preparation of polyurethane foam. Also, they may be reacted with diepoxides to provide resinous mixtures in the preparation of coatings and adhesives.

---

This invention is concerned with adducts of alkylcyclohexylpropylenediamines. More particularly, this invention is concerned with novel alkylene oxide addition products of alkylcyclohexylpropylenediamines and a method for their preparation.

Alkylene oxide adducts of fatty amines are well known and widely used in the detergent, paper, textile, plastics, rubber and paint industries. Further, in copending application Ser. No. 405,615, filed of an even date herewith, there are disclosed alkylene oxide adducts of alkylcyclohexylamines.

We have now discovered that valuable amine compounds may be obtained by the addition of alkylene oxides to N-alkylcyclohexyl-1,3-propanediamines. Tailored products having widely varying properties may be obtained by proper choice of the N-alkylcyclohexyl-1,3-propanediamine and alkylene oxide employed. From about 1 to about 100 mols of alkylene oxide are reacted with the N-alkylcyclohexyl-1,3-propanediamine at a temperature within the range of from about 50° to about 200° C.

The N-alkylcyclohexyl-1,3-propanediamine starting material for my invention is one having the formula:

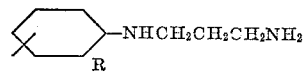

wherein R is a $C_4$–$C_{14}$ alkyl group. The alkyl group may be a branched or straight-chain alkyl group, the choice of groups depending upon the properties desired in the final product. For example, if a biologically soft surface-active agent is desired, a straight-chain alkyl group should be employed. The alkyl group may be attached to the ring at any position other than the number one position. As a practical matter, the N-alkylcyclohexyl-1,3-propanediamine employed will probably be a mixture of isomers with the 4-isomer predominating.

The N-alkylcyclohexyl-1,3-propanediamine starting materials of the present invention have three reactive amino hydrogen atoms, all of which react with the alkylene oxide. The availability of three reactive sites allows greater flexibility in the properties of the final product. The three amino hydrogen atoms are sufficiently reactive that each will react with one mol of an epoxide without the use of an extraneous catalyst. In order to add more than three mols of oxide, an alkoxylation catalyst as described hereinbelow is required. From about 0.01 to about 5 wt. percent of catalyst should be used, based on the weight of alkylcyclohexylpropylenediamine employed. The three mol adducts may be isolated and used as starting materials to prepare the higher adducts or higher adducts may be prepared directly from the N-alkylcyclohexyl-1,3-propanediamines.

Examples of alkoxylation catalysts are well known to those skilled in the art. Generally, these fall into three categories: alkaline, neutral and acid. The alkaline and neutral catalysts are the most suitable for our process. Alkaline catalysts include the alkali metals, alkali metal hydroxides, alkaline earth metal hydroxides and quaternary ammonium hydroxides. Suitable neutral catalysts include neutral salts such as alkali metal halides and quaternary ammonium halides. Specific catalysts that can be used include, for example, sodium, sodium hydroxide, potassium hydroxide, calcium hydroxide, barium hydroxide, benzyltrimethylammonium hydroxide, lithium chloride, potassium bromide and benzyltriethylammonium bromide. Preferred catalysts are sodium hydroxide and potassium hydroxide.

Alkylene oxides that may be reacted with active hydrogen compounds are also well known to those skilled in the art and include both mono- and diepoxides. Suitable monoepoxides are, for example, those having the formula:

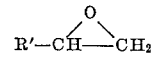

wherein R' is selected from the group consisting of hydrogen, $C_1$–$C_{18}$ alkyl, phenyl, chloromethyl and hydroxymethyl. Examples of such epoxides include ethylene oxide, propylene oxide, butylene oxide, dodecene oxide, styrene oxide, epichlorohydrin and glycidol.

Suitable diepoxides include butadiene diepoxide, vinylcyclohexene diepoxide, divinylbenzene diepoxide and various polymeric materials terminated with epoxide groups. Such polymeric materials are, for example, those obtained by the condensation polymerization of epichlorohydrin with bisphenol-A whereby there are obtained polymers having the formula:

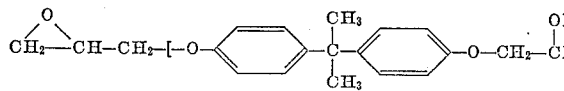
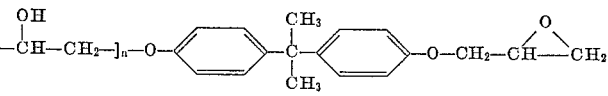

wherein $n$ is within the range of from about 0 to 8. Another polymeric diepoxide is that obtained by the reaction of epichlorohydrin with a polyglycol to give products having the formula:

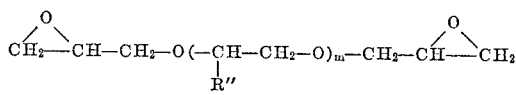

wherein $m$ is from 1 to about 200 and R'' may be hydrogen, a $C_1$–$C_{18}$ alkyl group or a phenyl group.

The addition of the alkylene oxide to the N-alkylcyclohexyl-1,3-propanediamine occurs at a temperature within the range of about 50° to about 200° C. The preferred temperature range is about 100° to about 150° C. When a volatile alkylene oxide is employed, the reactions are normally conducted in a closed vessel at the ambient pressure at the particular temperature employed.

At the completion of the reaction, it may be desirable to remove the catalyst. Neutral catalysts may often be removed simply by filtration. Alkaline catalysts may be neutralized and the salts removed by filtration. Acids that may be used to neutralize alkaline catalysts include phosphoric, sulfuric, acetic, carbon dioxide and solid organic acids as described in United States Patent 3,000,963.

The following specific examples are illustrative of our invention but are not intended to limit the scope of the invention in any respect.

Example I

The three-mol ethylene oxide adduct of N-nonyl-cyclohexyl-1,3-propanediamine was prepared in the following manner. To a one-liter stirred autoclave was added 367 g. (1.3 mols) of nonylcyclohexyl-1,3-propanediamine. The autoclave was flushed twice with nitrogen, 20 ml. of ethylene oxide was added and the mixture was heated to 96° C. at which point a reduction in pressure was noted. An additional 179 g. of ethylene oxide was added at 96° to 110° C. over a three-hour period. The reaction mixture was digested for an additional hour at 100° C. The product was a clear red liquid which was insoluble in water.

Example II

The three-mol propylene oxide adduct of N-nonyl-cyclohexyl-1,3-propanediamine was prepared as follows: To a one-liter stirred flask were added 141 g. (0.5 mol) of nonylcyclohexyl-1,3-propanediamine, 160 g. of methanol and 14 ml. of water. The solution was heated to 65° C. and propylene oxide addition was started. After 1.5 mols of propylene oxide was added, the mixture was digested for one hour at 65° C. The solution was light yellow. The solvent was evaporated to a pot temperature of 150° C. at a reduced pressure of about 30 mm. The product was a viscous but pourable liquid that was soluble in acetone and insoluble in water.

Example III

The nine-mol ethylene oxide adduct of N-nonylcyclohexyl-1,3-propanediamine was prepared in the following way. To a one-liter stirred autoclave were added 141 g. of nonyl-cyclohexyl-1,3-propanediamine (0.5 mol) and 0.71 g. of potassium hydroxide. The autoclave was flushed twice with nitrogen and 20 ml. of ethylene oxide was added. The contents were heated to 127° C. and additional ethylene oxide was added as it reacted at 127°–132° C. A total of 193 g. or 4.5 mols of ethylene oxide were added over a four-hour period. The contents were digested for an additional thirty minutes at 130° C. The product was a clear red liquid that exhibited good foaming properties.

Example IV

The three-mol ethylene oxide adduct of dodecyl-cyclohexyl-1,3-propanediamine was prepared in the following way. To a 600 ml. shaker-type autoclave were added 50 g. of N-dodecyclohexyl-1,3-propanediamine, 150 g. of methanol and 7 g. of water. The autoclave was flushed twice with nitrogen and 25 ml. of ethylene oxide was added. The reaction mixture was heated to 100° C. and held at this temperature for two hours. The methanol and water were removed to a pot temperature of 200° C. at atmospheric pressure and then to a pot temperature of 130° C. at 1 mm. pressure. The product was a clear amber liquid insoluble in water and slightly soluble in acetone

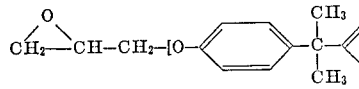

and cyclohexane. It had an equivalent weight of 230 (Theory 229).

The novel adducts of the present invention are useful as detergents and as polyol intermediates in the preparation of polyurethane foams. The preferred mono-epoxide addition products are those obtained from ethylene oxide, propylene oxide, butylene oxide, epichlorohydrin, and mixtures thereof. Such products have the formula:

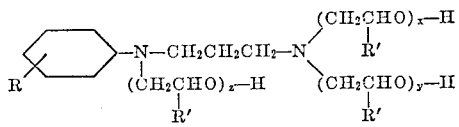

wherein R is a $C_4$–$C_{14}$ alkyl group, R′ is selected from the group consisting of hydrogen, methyl, ethyl and chloromethyl groups, and the sum of $x$ plus $y$ plus $z$ is from 1 to 100.

Cross-linking results when diepoxides are used, thereby resulting in very complex mixtures. These resinous mixtures are useful in the preparation of coatings and adhesives.

Having thus described our invention, we claim:
1. A product having the formula:

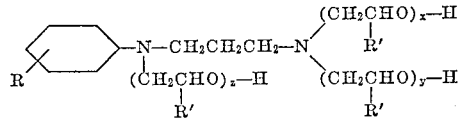

wherein R is a $C_4$–$C_{14}$ alkyl group. R′ is selected from the group consisting of hydrogen, methyl, ethyl, chloromethyl, and mixtures thereof, and the sum of $x$ plus $y$ plus $z$ is 1 to 100.

2. A product as in claim 1 wherein R′ is hydrogen.
3. A product as in claim 1 wherein R′ is methyl.
4. A method for the preparation of an alkylene oxide addition product which comprises adding from 1 to about 100 mols of an alkylene oxide having the formula:

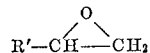

wherein R′ is selected from the group consisting of hydrogen, $C_1$–$C_{18}$ alkyl, phenyl, chloromethyl, hydroxmethyl, and mixtures thereof, to an N-alkylcyclohexyl-1,3-propanediamine having the formula:

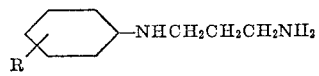

wherein R is a $C_4$–$C_{14}$ alkyl group at a temperature within the range of about 50° to about 200° C. in the presence of from about 0.01 to about 5 wt. percent of an alkoxylation catalyst based on the weight of N-alkylcyclohexyl-1,3-propanediamine employed, said alkoxylation catalyst being selected from the group consisting of alkali metals, alkali metal hydroxides, alkaline earth metal hydroxides, quaternary ammonium hydroxides, alkali metal halides and quaternary ammonium halides.

5. A method as in claim 4 wherein the alkylene oxide is ethylene oxide.
6. A method as in claim 4 wherein the alkylene oxide is propylene oxide.
7. A method as in claim 4 wherein one–three mols of alkylene oxide are added without the use of an alkoxylation catalyst.
8. A method for the preparation of an epoxide addition product which comprises adding from 1 to about 100 mols of a diepoxide selected from the group consisting of butadiene diepoxide, vinylcyclohexene diepoxide, divinylbenzene diepoxide, and polymeric diepoxides having the formulas:

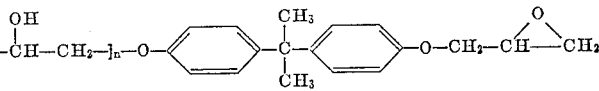

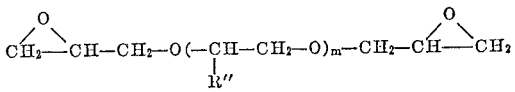

wherein $n$ is from 0 to about 8, $m$ is from 1 to about 200 and R″ is selected from the group consisting of hydrogen, C–C₁₈ alkyl and phenyl to an N-alkylcyclohexyl-1,3-propanediamine having the formula:

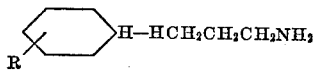

wherein R is a $C_4$–$C_{14}$ alkyl group at a temperature within the range of about 50° to about 200° C. in the presence of from about 0.01 to about 5 wt. percent of an alkoxylation catalyst based on the weight of N-alkylcyclohexyl-1,3-propanediamine employed, said alkoxylation catalyst being selected from the group consisting of alkali metals, alkali metal hydroxides, alkaline earth metal hydroxides, quaternary ammonium hydroxides, alkali metal halides and quaternary ammonium halides.

9. A method as in claim 8 wherein one–three mols of diepoxide are added without the use of a catalyst.

10. A product prepared by the method of claim 8.

References Cited

UNITED STATES PATENTS 3,087,966   4/1963   Currier et al. _____ 260—563

WILLIAM H. SHORT, *Primary Examiner.*

T. D. KERWIN, *Assistant Examiner.*